(12) United States Patent
Sakamaki et al.

(10) Patent No.: US 9,740,153 B2
(45) Date of Patent: Aug. 22, 2017

(54) POWER CONTROL DEVICE, ELECTRICAL APPARATUS, AND IMAGE FORMING DEVICE

(71) Applicant: FUJI XEROX CO., LTD., Minato-ku, Tokyo (JP)

(72) Inventors: Tadamasa Sakamaki, Yokohama (JP); Shinho Ikeda, Yokohama (JP); Yuji Murata, Yokohama (JP); Hiroaki Yamamoto, Yokohama (JP); Masakazu Kawashita, Yokohama (JP); Shunsuke Kasahara, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 505 days.

(21) Appl. No.: 14/293,063

(22) Filed: Jun. 2, 2014

(65) Prior Publication Data
US 2015/0012117 A1 Jan. 8, 2015

(30) Foreign Application Priority Data

Jul. 3, 2013 (JP) .................................. 2013-139646

(51) Int. Cl.
| | | |
|---|---|---|
| G03G 21/14 | (2006.01) | |
| G03G 15/00 | (2006.01) | |
| G01V 1/00 | (2006.01) | |
| G06F 11/14 | (2006.01) | |

(52) U.S. Cl.
CPC ......... *G03G 15/5004* (2013.01); *G01V 1/008* (2013.01); *G06F 11/1458* (2013.01)

(58) Field of Classification Search
CPC ..................................................... G05B 15/02

USPC ........................................................... 700/12
See application file for complete search history.

(56) References Cited

U.S. PATENT DOCUMENTS

| | | | | |
|---|---|---|---|---|
| 4,615,609 | A * | 10/1986 | Honma .............. | G03G 15/5004 399/130 |
| 8,760,130 | B2 * | 6/2014 | Yamaguchi ............ | H03K 17/60 323/265 |
| 2010/0169021 | A1 * | 7/2010 | Moisio ................... | G01V 1/008 702/15 |
| 2014/0380078 | A1 * | 12/2014 | Oh ...................... | G03G 15/5004 713/324 |

FOREIGN PATENT DOCUMENTS

| | | |
|---|---|---|
| JP | 2008-131299 A | 6/2008 |
| JP | 2009-251275 A | 10/2009 |
| JP | 2012-252512 A | 12/2012 |

OTHER PUBLICATIONS

EP1923749B1, Tat, p. 1-21, published on Mar. 6, 2013.*

* cited by examiner

*Primary Examiner* — Sean Shechtman
(74) *Attorney, Agent, or Firm* — Sughrue Mion, PLLC (57) ABSTRACT

A power control device includes non-volatile memory, a controller, and a logic circuit. The non-volatile memory includes a function of externally outputting a logical state of a bit stored in a specific area as a state hold signal that indicates an ON/OFF state of a device function unit before a power cutoff. The controller controls the ON/OFF state of the device function unit and also writes the ON/OFF state of the device function unit to the specific area of the non-volatile memory. The logic circuit controls power supply to the controller on the basis of a logic level of the state hold signal from the non-volatile memory.

8 Claims, 9 Drawing Sheets

THE CASE OF SWITCHING THE POWER SWITCH 59 TO ON

| ON/OFF STATE HOLD SIGNAL 101 | SWITCH OPERATION LATCH SIGNAL 102 | OUTPUT OF OR CIRCUIT 60 | POWER CONTROL SIGNAL 103 | OUTPUT OF AND CIRCUIT 61 |
|---|---|---|---|---|
| L | L | L | H | L |
| L | H | H | H | H |
| H | H | H | H | H |

OPERATE POWER SWITCH 59

LOGIC BIT CHANGE IN NON-VOLATILE MEMORY 54 BY CPU 53

FIG. 6

THE CASE OF SWITCHING THE POWER SWITCH 59 TO OFF

| | ON/OFF STATE HOLD SIGNAL 101 | SWITCH OPERATION LATCH SIGNAL 102 | OUTPUT OF OR CIRCUIT 60 | POWER CONTROL SIGNAL 103 | OUTPUT OF AND CIRCUIT 61 |
|---|---|---|---|---|---|
| | H | H | H | H | H |
| LOGIC BIT CHANGE IN NON-VOLATILE MEMORY 54 BY CPU 53 | L | — | — | H | H |
| PROCESS BY LOW-POWER CONTROLLER 55 | L | — | — | L | L |

FIG. 7

OPERATION AFTER RECOVERING FROM POWER FAILURE (PRE-FAILURE STATE: ON)

| ON/OFF STATE HOLD SIGNAL 101 | SWITCH OPERATION LATCH SIGNAL 102 | OUTPUT OF OR CIRCUIT 60 | POWER CONTROL SIGNAL 103 | OUTPUT OF AND CIRCUIT 61 |
|---|---|---|---|---|
| H | L | H | H | H |

OPERATION AFTER RECOVERING FROM POWER FAILURE (PRE-FAILURE STATE: OFF)

| ON/OFF STATE HOLD SIGNAL 101 | SWITCH OPERATION LATCH SIGNAL 102 | OUTPUT OF OR CIRCUIT 60 | POWER CONTROL SIGNAL 103 | OUTPUT OF AND CIRCUIT 61 |
|---|---|---|---|---|
| L | L | L | H | L |
| L | H | H | H | H |

OPERATE POWER SWITCH 59

POWER CONTROL DEVICE, ELECTRICAL APPARATUS, AND IMAGE FORMING DEVICE

CROSS-REFERENCE TO RELATED APPLICATIONS

This application is based on and claims priority under 35 USC 119 from Japanese Patent Application No. 2013-139646 filed Jul. 3, 2013.

BACKGROUND

Technical Field

The present invention relates to a power control device, an electrical apparatus, and an image forming device.

SUMMARY

According to an aspect of the invention, there is provided a power control device includes non-volatile memory, a controller, and a logic circuit. The non-volatile memory includes a function of externally outputting a logical state of a bit stored in a specific area as a state hold signal that indicates an ON/OFF state of a device function unit before a power cutoff. The controller controls the ON/OFF state of the device function unit and also writes the ON/OFF state of the device function unit to the specific area of the non-volatile memory. The logic circuit controls power supply to the controller on the basis of a logic level of the state hold signal from the non-volatile memory.

BRIEF DESCRIPTION OF THE DRAWINGS

Exemplary embodiments of the present invention will be described in detail based on the following figures, wherein.

DETAILED DESCRIPTION

Background

First, the background and an overview of the present invention will be described in order to aid understanding thereof.

Recently, push switches have come to be used as a power switch for remotely switching a device ON/OFF, even for multi-function devices that include multiple functions, such as facsimile functions, printer functions, and scanner functions. However, such a push switch differs from a seesaw switch in that the operated state of the switch may not be mechanically retained.

In addition, in order to avoid wasteful power consumption, generally the activation state immediately after supplying power to a device is set to a power-off state. For this reason, in an image forming device using such a push switch, even in the case in which the push switch has been operated to put the image forming device in a power-on state, if the source of electrical power is temporarily cut off due to a power failure or the like, the image forming device will be in a power-off state after recovering from the power failure and reestablishing a source of electrical power.

Consequently, in the case in which an image forming device is switched to a power-on state over a long period and made to stand by to receive facsimiles, such as over a summer vacation or year-end holiday, for example, there is a problem in that if a temporary power failure occurs, the image forming device may switch to a power-off state after recovering from the power failure, and the standby state for receiving facsimiles may not be maintained.

One conceivable method for returning the device state to the pre-failure ON/OFF state after recovering from a power failure is to record the pre-failure ON/OFF state using non-volatile memory or the like, and control the ON/OFF state of the device on the basis of the recorded content after recovering from a power failure.

However, in the case of using such a method, the content recorded in the non-volatile memory may not be read until after the CPU or the like for retrieving information recorded in the non-volatile memory or the like has finished activating software. For this reason, even the case of switching the device state to a power-off state may involve the CPU first activating software and booting up to a state enabling access to the non-volatile memory, and then switching the entire device to a power-off state. This configuration wastes power, and thus is problematic. Also, there is a problem in that if the software freezes or locks up, the ON/OFF state of the device may not be returned to the state prior to power failure recovery.

Exemplary Embodiments

Next, exemplary embodiments of the present invention will be described in detail and with reference to the drawings.

Figure 1:
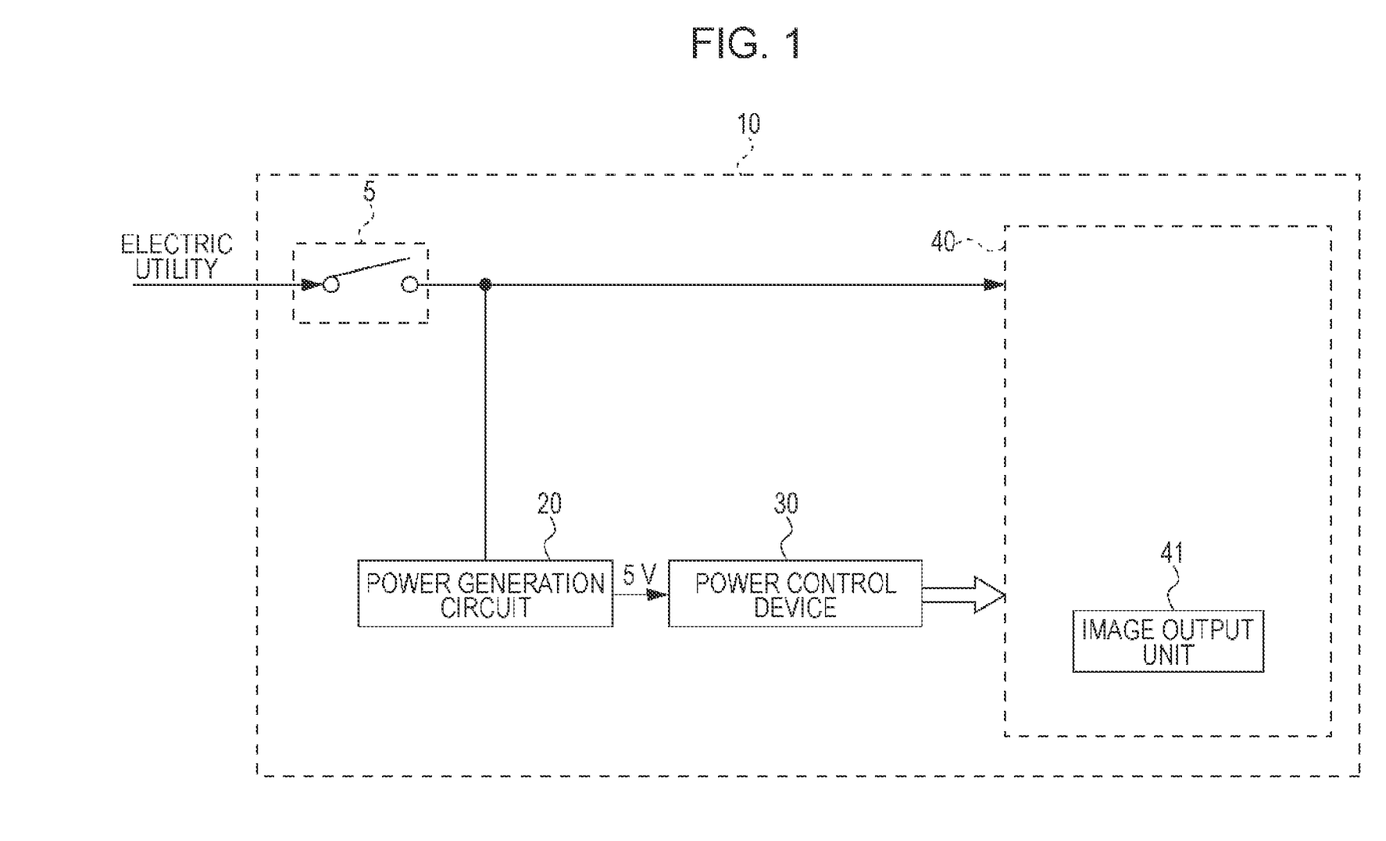
FIG. 1 is a block diagram illustrating a configuration of an image forming device 10 according to an exemplary embodiment of the present invention.

FIG. 1 is a block diagram illustrating a configuration of an image forming device 10 according to an exemplary embodiment of the present invention. The image forming device 10 according to the present exemplary embodiment is a device referred to as a multi-function device, and includes multiple functions such as facsimile functions, printer functions, and scanner functions.

As illustrated in FIG. 1, the image forming device 10 according to the present exemplary embodiment is equipped with a power switch 5, a power generation circuit 20, a power control device 30, and a device function unit 40 that includes an image output unit 41. The image output unit 41 has a function of outputting an image onto a print medium such as a paper sheet.

The power generation circuit 20 generates 5 V power from an electric utility supplied via the power switch 5, and supplies the generated 5 V power to the power control device 30.

The power control device 30 controls the ON/OFF state of the device function unit 40. Additionally, the device function unit 40 operates using power from the electric utility supplied via the power switch 5, with the ON/OFF state being controlled by the power control device 30.

Figure 2:
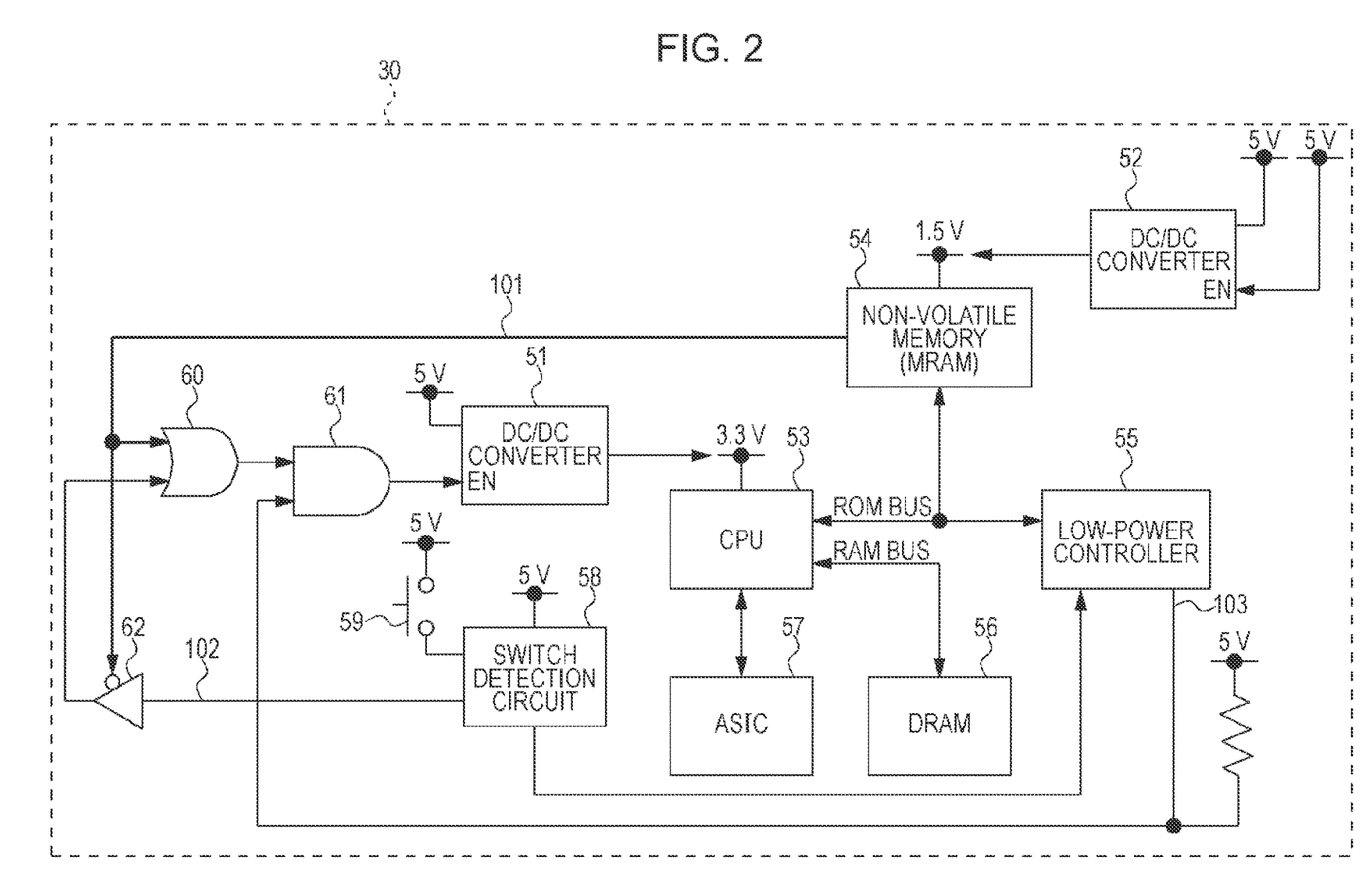
FIG. 2 is a diagram illustrating a hardware configuration of the power control device 30 illustrated in FIG. 1.

Next, FIG. 2 illustrates a hardware configuration of the power control device 30 illustrated in FIG. 1.

As illustrated in FIG. 2, the power control device 30 is equipped with DC/DC converters 51 and 52, a CPU 53, non-volatile memory 54, a low-power controller 55, DRAM 56, an ASIC 57, a switch detection circuit 58, a power switch 59, an OR circuit 60 (logical disjunction circuit), an AND circuit (logical conjunction circuit) 61, and a buffer circuit 62.

The DC/DC converters 51 and 52 are voltage generators that take the 5 V power generated by the power generation circuit 20, and respectively generate a 1.5 V voltage for supplying to the non-volatile memory 54 and the like, and a 3.3 V voltage for supplying to the CPU 53 and the like. Note that the DC/DC converters 51 and 52 are provided with an enable (EN) terminal. When a high-level (hereinafter designated H) voltage is applied to this EN terminal, the DC/DC converter 51 or 52 enters an operational state to generate and output a voltage of preset value.

The CPU 53 functions as a controller that controls the ON/OFF state of the device function unit 40, and writes the ON/OFF state of the device function unit 40 to a specific area of the non-volatile memory 54 via a ROM bus. The CPU 53 also switches the device function unit 40 to an ON state in the initial state after 3.3 V power is supplied from the DC/DC converter 51.

In addition, the CPU 53 conducts various image processing using components such as the DRAM 56 as system memory, and the ASIC 57.

The non-volatile memory 54 is realized by magnetoresistive random-access memory (MRAM), and is equipped with a function enabling the logical state of a bit stored in a specific area to be output externally from a general input/output (GIO) port. Additionally, the non-volatile memory 54 according to the present exemplary embodiment stores the ON/OFF state of the device function unit 40 prior to a power cutoff as an ON/OFF state hold bit, and externally outputs the logic level of this ON/OFF state hold bit as an ON/OFF state hold signal 101.

In other words, it is possible to shut down the CPU 53 and externally ascertain the logic level of the ON/OFF state hold bit stored in the specific area, without reading the logic level of the ON/OFF state hold bit stored in the non-volatile memory 54.

Figure 3:
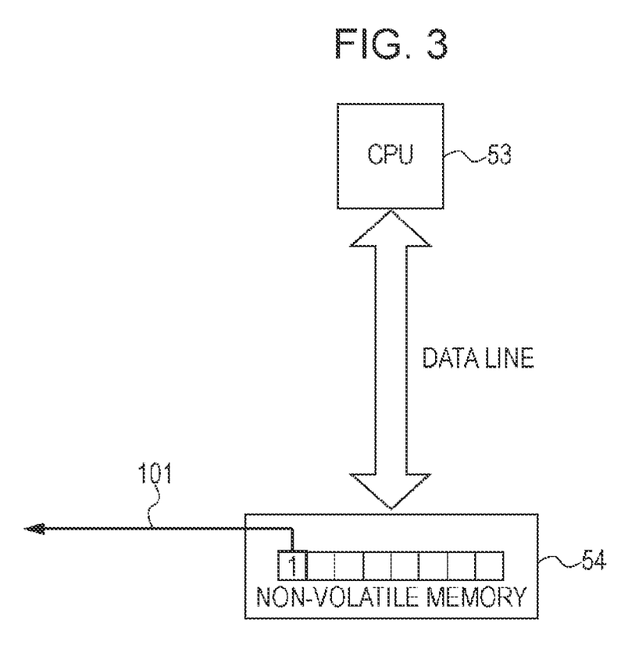
FIG. 3 is a diagram illustrating how an ON/OFF state hold signal 101 is output from non-volatile memory 54.
Figure 4:
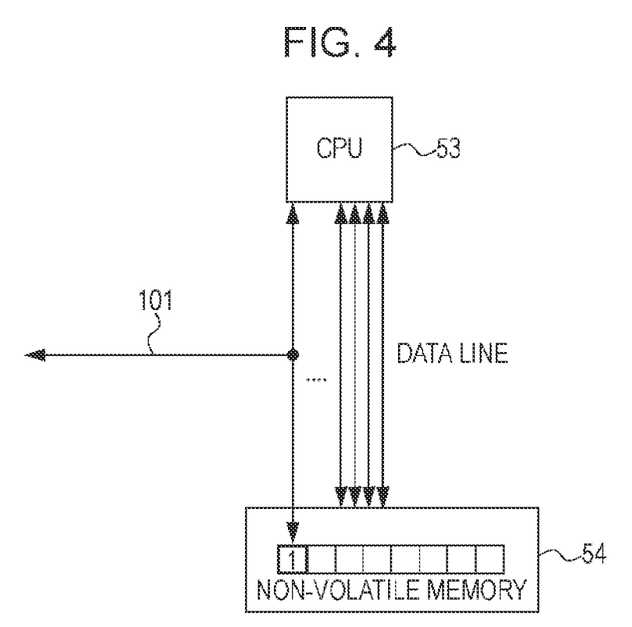
FIG. 4 is another diagram illustrating how an ON/OFF state hold signal 101 is output from non-volatile memory 54.

FIG. 3 illustrates how an ON/OFF state hold signal 101 is output from non-volatile memory 54 according to the present exemplary embodiment. FIG. 3 demonstrates how the logic level of an ON/OFF state hold bit stored in a specific area of the non-volatile memory 54 is output as the on/off state hold signal 101. Note that the on/off state hold signal 101 may be configured to be output from the non-volatile memory 54 using a dedicated line separate from a data line between the CPU 53 and the non-volatile memory 54, as illustrated in FIG. 3, or configured to be output using one dual-purpose line from among multiple data lines between the CPU 53 and the non-volatile memory 54, as illustrated in FIG. 4.

Note that although the present exemplary embodiment describes the case of using MRAM as the non-volatile memory 54, the present invention is similarly applicable even in the case of using another type of non-volatile memory, such as flash memory.

The power switch 59 is a switch with a push switch structure, and is structured so that the switch contacts are connected only when the switch is depressed. In the present exemplary embodiment, such a push switch is adopted as the power switch 59 in order to accommodate a remote control that remotely manages the ON/OFF state of a device. However, such a push switch differs from a seesaw switch, and may not be structured to retain a depressed state of the switch.

Consequently, if the power switch 59 is operated while the device is in an ON state, a process to switch the device to an OFF state is conducted, whereas if the power switch 59 is operated while the device is in an OFF state (power-off state), a process to switch the device to an ON state (power-on state) is conducted, and the ON/OFF state of the device is toggled by operation of the power switch 59.

The switch detection circuit 58 is a circuit for detecting that the power switch 59 has been operated, in which a latch is enabled by the operation of the power switch 59, and output as a switch operation latch signal 102. In other words, in the initial state after power is supplied, the switch operation latch signal 102 is at a low level (hereinafter designated L). If the power switch 59 is operated, the switch operation latch signal 102 switches to H. Thereafter, the switch operation latch signal 102 toggles H/L every time the power switch 59 is operated.

Also, the switch detection circuit 58 transmits information indicating that the power switch 59 was operated to the low-power controller 55.

The low-power controller 55 manages the ON/OFF state of the device function unit 40 on the basis of information from the switch detection circuit 58, and stores information about the appropriate ON/OFF state of the device function unit 40 in a specific area as a register. Also, the low-power controller 55 outputs a power control signal 103 that goes H in the case of switching the device function unit 40 to an ON state, and goes L in the case of switching to an OFF state.

Note that this power control signal 103 is pulled up to a high level of 5 V, and remains in the H state when the low-power controller 55 is not in an operational state.

Also, the CPU 53 ascertains the appropriate ON/OFF state of the device function unit 40 by reading information stored in a specific area of the low-power controller 55 via a ROM bus, and switches the device function unit 40 ON/OFF.

The buffer circuit 62 outputs the logic level of the switch operation latch signal 102 from the switch detection circuit 58 as-is in the case in which the ON/OFF state hold signal 101 from the non-volatile memory 54 is L.

The OR circuit 60 computes the logical disjunction between the ON/OFF state hold signal 101 from the non-volatile memory 54 and the output from the buffer circuit 62, and outputs the computed result.

The AND circuit 61 computes the logical conjunction between the output of the OR circuit 60 and the power control signal 103 from the low-power controller 55, and outputs the computed result to the EN terminal of the DC/DC converter 51.

The buffer circuit 62, the OR circuit 60, and the AND circuit 61, by operating as described above, function as a logic circuit that controls the supply of power to the CPU 53 on the basis of the logic level of the ON/OFF state hold signal 101 from the non-volatile memory 54.

In addition, this logic circuit made up of the buffer circuit 62, the OR circuit 60, and the AND circuit 61 puts the DC/DC converter 51 in an operational state by setting the EN terminal to H in the case in which the logic level of the ON/OFF state hold signal 101 from the non-volatile memory 54 indicates that the device function unit 40 was in an ON state before power was cut off.

Figure 5:
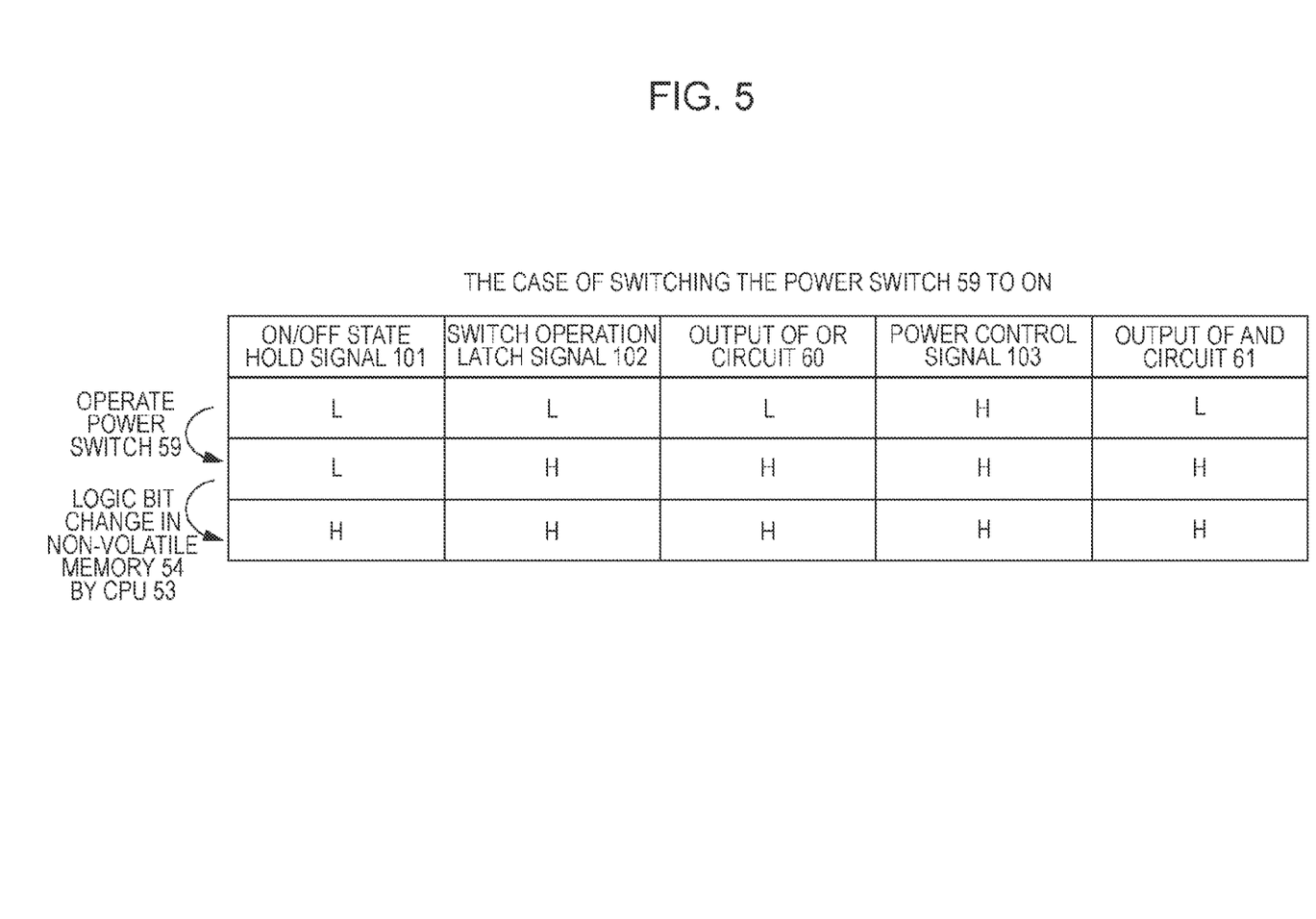
FIG. 5 is a diagram for illustrating operation of a logic circuit in the case of switching a power switch 59 from an OFF state to an ON state.
Figure 6:
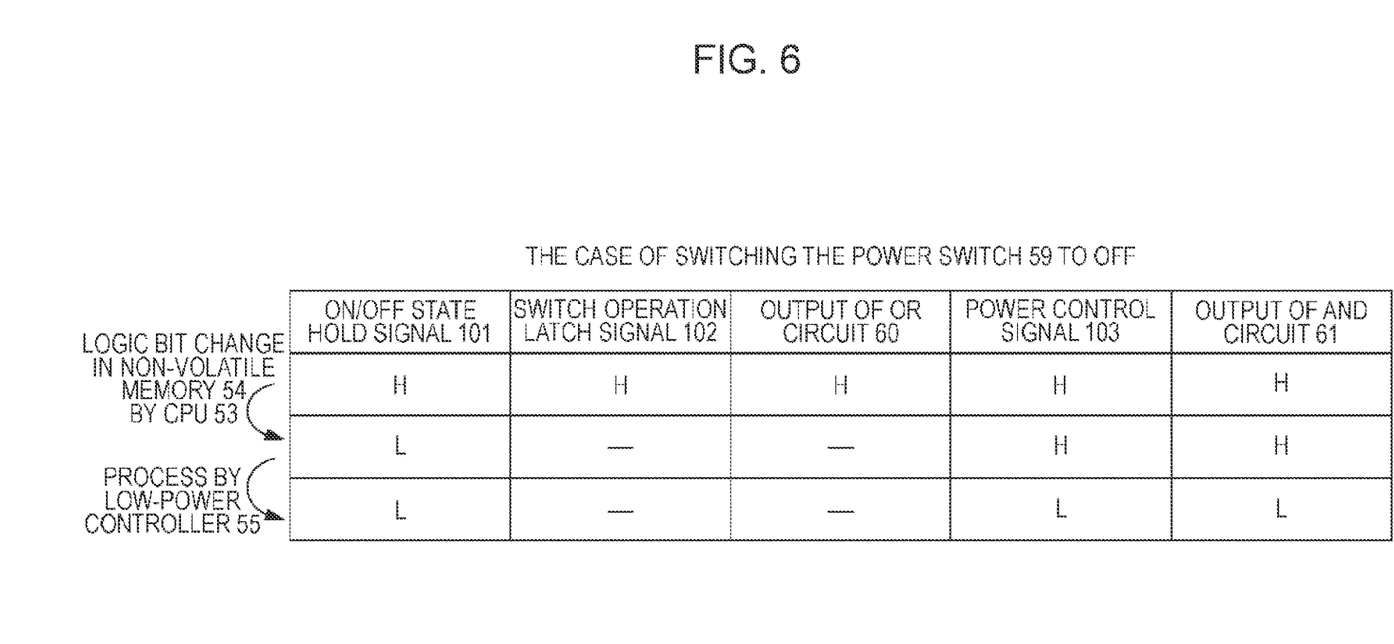
FIG. 6 is a diagram for illustrating operation of a logic circuit in the case of switching a power switch 59 from an ON state to an OFF state.
Figure 7:
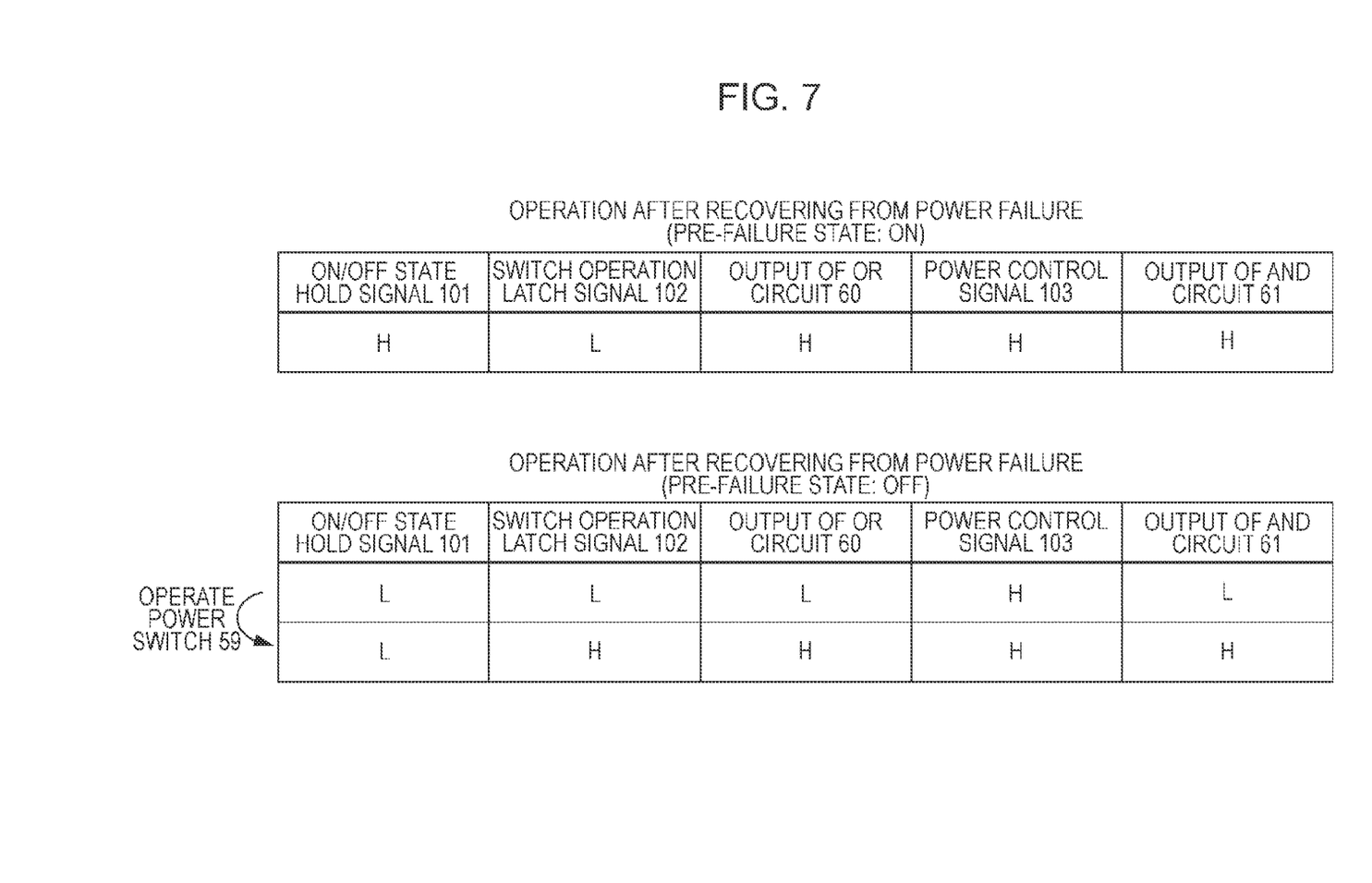
FIG. 7 is a diagram for illustrating operation of a logic circuit after recovering from a power failure (recovery from a power cutoff state)

Operation of such a logic circuit made up of the buffer circuit 62, the OR circuit 60, and the AND circuit 61 will be described with reference to FIGS. 5 to 7.

First, operation in the case of switching the power switch 59 from an OFF state to an ON state will be described with reference to FIG. 5.

In the case in which the device function unit 40 is in an OFF state, "0" indicating the OFF state is written to the ON/OFF state hold bit in a specific area of the non-volatile memory 54, and the ON/OFF state hold signal 101 goes L. Subsequently, the switch operation latch signal 102 also goes L, and since the ON/OFF state hold signal 101 is L, the buffer circuit 62 outputs L. For this reason, the output of the OR circuit 60 goes L. As a result, even though the power control signal 103 is pulled up to H, the output of the AND circuit 61 goes L, and the DC/DC converter 51 enters a non-operational state.

If the power switch 59 is operated while in such a state, the logic level of the switch operation latch signal 102 toggles from L to H, and the output of the OR circuit 60 also goes H. For this reason, the output of the AND circuit 61 also goes H, and the DC/DC converter 51 enters an operational state. For this reason, the CPU 53 is activated as a result of being supplied with 3.3 V power, and the device function unit 40 is switched to an ON state. Additionally, after finishing a series of control operations, the CPU 53 writes "1" indicating an ON state to the ON/OFF state hold bit in the specific area of the non-volatile memory 54. As a result, the ON/OFF state hold signal 101 goes H.

Next, operation in the case of switching the power switch 59 from an ON state to an OFF state will be described with reference to FIG. 6.

In the case in which the device function unit 40 is in an ON state, as described above, the ON/OFF state hold signal 101, the switch operation latch signal 102, the output of the OR circuit 60, the power control signal 103, and the output of the AND circuit 61 all go H.

If the power switch 59 is operated while in this state, the low-power controller 55, on the basis of information from the switch detection circuit 58, stores information indicating the appropriate ON/OFF state of the device function unit 40. Reading this information, the CPU 53 writes "0" to the ON/OFF state hold bit of the non-volatile memory 54.

After that, the low-power controller 55 toggles the power control signal 103 from H to L, and thus the output of the AND circuit 61 goes L, the DC/DC converter 51 enters a non-operational state, and the device function unit 40 switches to an OFF state.

Next, operation of a logic circuit after recovering from a power failure (recovery from a power cutoff state) will be described with reference to FIG. 7.

First, in the case of an ON state prior to a power failure, the ON/OFF state hold signal 101 is H, and thus the output of the OR circuit 60 goes H, even if the switch operation latch signal 102 is L. Subsequently, at the time of the power failure recovery, the power control signal 103 is pulled up to H, and the output of the AND circuit 61 also goes H. For this reason, the DC/DC converter 51 enters an operational state, and 3.3 V power is supplied to the CPU 53. As a result, the CPU 53 activates, and controls the device function unit 40 to switch to an ON state.

Meanwhile, in the case of an OFF state prior to a power failure, the ON/OFF state hold signal 101 is L, and since the switch operation latch signal 102 is also L, the output of the OR circuit 60 goes L. For this reason, the output of the AND circuit 61 goes L. Consequently, the DC/DC converter 51 does not enter an operational state.

Subsequently, if the power switch 59 is operated from such a state, the switch operation latch signal 102 goes from L to H, and thus the output of the OR circuit 60 goes H. Additionally, since the power control signal 103 is pulled up to H, the output of the AND circuit 61 also goes H. For this reason, the DC/DC converter 51 enters an operational state, and 3.3 V power is supplied to the CPU 53. As a result, the CPU 53 activates, and controls the device function unit 40 to switch to an ON state.

In this way, in a power control device 30 according to the present exemplary embodiment, even in the case in which the supply of power is resumed after a power failure during which the supply of power is cut off, the ON/OFF state of the device function unit 40 is returned to the state before power was cut off, without the activation of software by the CPU 53 or the like.

Consequently, in the case in which the image forming device 10 is switched to a power-on state over a long period and made to stand by to receive facsimiles, such as over a summer vacation or year-end holiday, for example, even if a temporary power failure occurs, the image forming device 10 is controlled so as to return to the original power-on state after recovering from the power failure. For this reason, the state of standing by to receive facsimiles is maintained.

Note that in the initial state after power is supplied, the CPU 53 may be configured to control the device function unit 40 so that rather than continually being in an ON state, the device function unit 40 is switched to an ON state only in the case in which the current time is within a preset time period. For example, the CPU 53 may be configured to control the device function unit 40 to be in an OFF state rather than an ON state during the period from 11 p.m. to 6 a.m. the following day, even after recovering from a power failure.

According to an image forming device 10 according to the present exemplary embodiment as described above, when recovering from a power failure state, the image forming device 10 is returned to the state from before the power failure state. However, in some cases, a power-on state may not be appropriate even after recovering from a power failure, such as in the case in which a large-scale earthquake causing a temporary power failure occurs.

For this reason, the acceleration of the device function unit 40 may be detected using an acceleration detector such as an acceleration sensor. In the case in which the detected acceleration is greater than a preset value, it may be determined that an earthquake has occurred, and the device function unit 40 may be controlled to switch to an OFF state after recovering from the power failure, even if the pre-failure state was an ON state.

However, even in the case in which the acceleration detected by the acceleration sensor is greater than a preset value, it is conceivable that controlling the device function unit 40 to switch to an OFF state after recovering from a power failure may be inappropriate, such as in the case in which a normal power-off process has been conducted according to a user operation. For this reason, it may also be configured so that, even in the case of detecting that an earthquake has occurred, the device function unit 40 is not controlled to switch to an OFF state after recovering from a power failure in the case in which a normal power-off process was conducted.

In order to conduct control like the above, the image forming device 10 is provided with an acceleration sensor. The CPU 53 determines whether or not an earthquake has occurred on the basis of an acceleration value detected by this acceleration sensor. In the case of determining that an earthquake has occurred, the CPU 53 writes an earthquake detect bit indicating whether or not an earthquake has occurred to another specific area different from the specific area storing the ON/OFF state hold bit of the non-volatile memory 54.

In addition, the CPU 53 writes a normal off process check bit, which indicates that a normal power-off process was conducted, to a specific area different from those of the above ON/OFF state hold bit and earthquake detect bit in the non-volatile memory 54.

The state of the non-volatile memory 54 in the case of conducting such control will be described with reference to FIG. 8.

The non-volatile memory 54 stores, in respective specific areas, an ON/OFF state hold bit 81 that indicates whether the state of the device function unit 40 prior to a power failure was an ON state or an OFF state, an earthquake detect bit 82 that indicates whether or not an earthquake was detected, and a normal off process check bit 83 that indicates whether or not a normal power-off process was conducted.

In addition, the logic levels being stored in the ON/OFF state hold bit 81, the earthquake detect bit 82, and the normal off process check bit 83 are output externally as signals.

At this point, as described earlier, "0" is written to the ON/OFF state hold bit 81 in the case of an ON state before the power was cut off, and "1" is written in the case of an OFF state before the power was cut off.

Also, "0" is written to the earthquake detect bit 82 in the case in which an earthquake is detected, and "1" is written in the case in which an earthquake is not detected.

Also, the normal off process check bit 83 ordinarily holds "0", but is overwritten with "1" if a normal power-off process is conducted.

In addition, the non-volatile memory 54 externally outputs the logical state of the bit stored as the earthquake detect bit 82 as an earthquake detection signal that indicates whether or not an earthquake was detected, and externally outputs the logical state of the bit stored as the normal off process check bit 83 as an output signal that indicates whether or not a normal power-off process was conducted.

Figure 8:
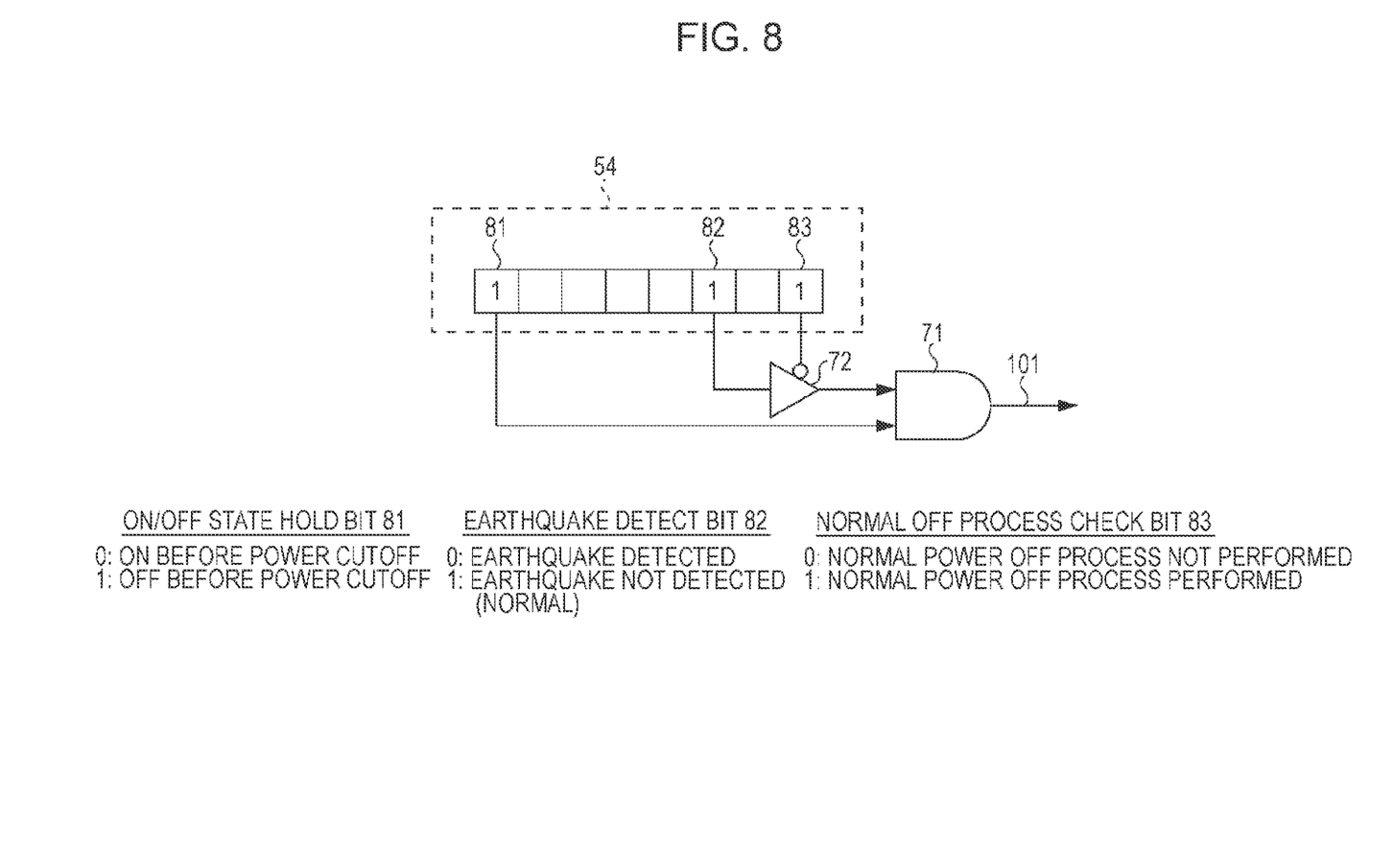
FIG. 8 is a diagram for illustrating the state of non-volatile memory 54 in the case where an earthquake is detected and the ON/OFF state of a device function unit 40.

Also, in the case in which such a configuration is used, the ON/OFF state hold signal 101 is generated and output by a logic circuit as illustrated in FIG. 8. This logic circuit is equipped with an AND circuit 71 and a buffer circuit 72.

In the case in which the output signal based on the normal off process check bit 83 output from the non-volatile memory 54 is L, the buffer circuit 72 outputs the logic level of the output signal based on the earthquake detect bit 82 as-is. Note that in the case in which the output signal based on the normal off process check bit 83 output from the non-volatile memory 54 is H, the output of the buffer circuit 72 is configured to go H.

The AND circuit 71 computes the logical conjunction between the output of the buffer circuit 72 and the output signal based on the ON/OFF state hold bit 81, and outputs the computed result as the ON/OFF state hold signal 101.

The above logic circuit made up of the AND circuit 71 and the buffer circuit 72 in this way conducts control to not supply power to the CPU 53 in the case in which the logic level of the earthquake detect bit 82 indicates that an earthquake was detected, even in the case in which the logic level of the ON/OFF state hold bit 81 in the non-volatile memory 54 indicates that device function unit 40 was in an ON state before the power was cut off.

Also, this logic circuit conducts control to output the logic level of the ON/OFF state hold bit 81 as the ON/OFF state hold signal 101 in the case in which the logic level of the normal off process check bit 83 indicates that a normal power-off process was executed, even in the case in which the logic level of the earthquake detect bit 82 indicates that an earthquake was detected.

Figure 9:
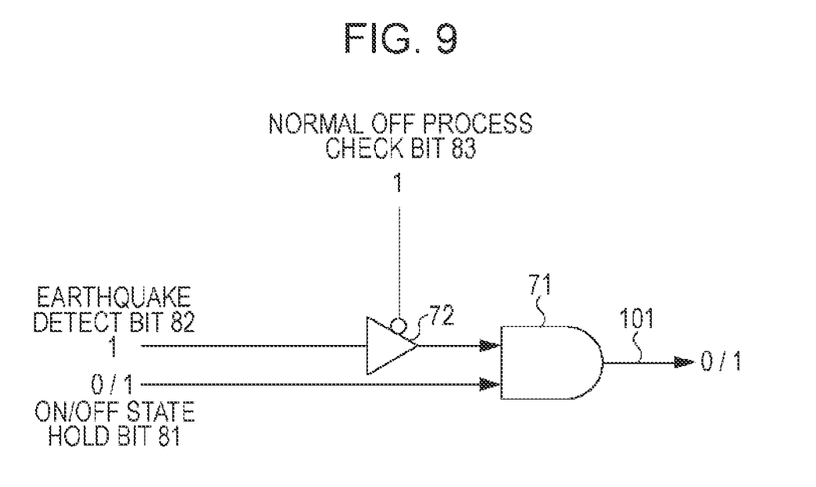
FIG. 9 is a diagram for explaining operation of a logic circuit in the case where an earthquake is not detected.

Operation of the logic circuit will be described with reference to FIGS. 9 to 11.

First, operation in the case in which an earthquake is not detected will be described with reference to FIG. 9. In the case in which an earthquake is not detected, the earthquake detect bit 82 becomes "1", and the normal off process check bit 83 also becomes "1". For this reason, the buffer circuit 72 outputs H without operating, and thus the logic level of the ON/OFF state hold bit 81 is output as the ON/OFF state hold signal 101.

Figure 10:
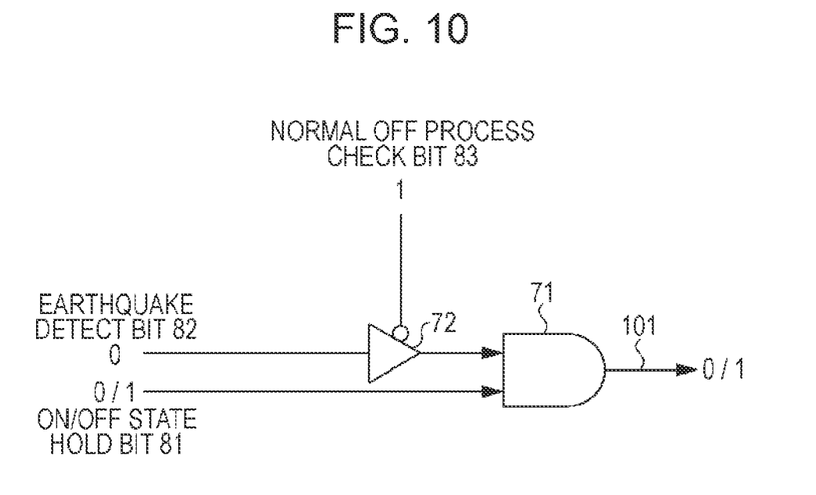
FIG. 10 is a diagram for explaining operation of a logic circuit in the case where an earthquake is detected, and a normal power-off process is executed.

Also, even in the case in which an earthquake was detected, in the case in which a normal power-off process was executed, the earthquake detect bit 82 becomes "0", and the normal off process check bit 83 becomes "1", as illustrated in FIG. 10. For this reason, the buffer circuit 72 outputs H without operating, and thus the logic level of the ON/OFF state hold bit 81 is output as the ON/OFF state hold signal 101.

Since such control is conducted, even if an earthquake is detected, in the case in which a normal power-off process was not conducted, the state of the device function unit 40 after recovering from a power failure is reverted to the pre-failure state on the basis of the logic level of the ON/OFF state hold bit 81.

Figure 11:
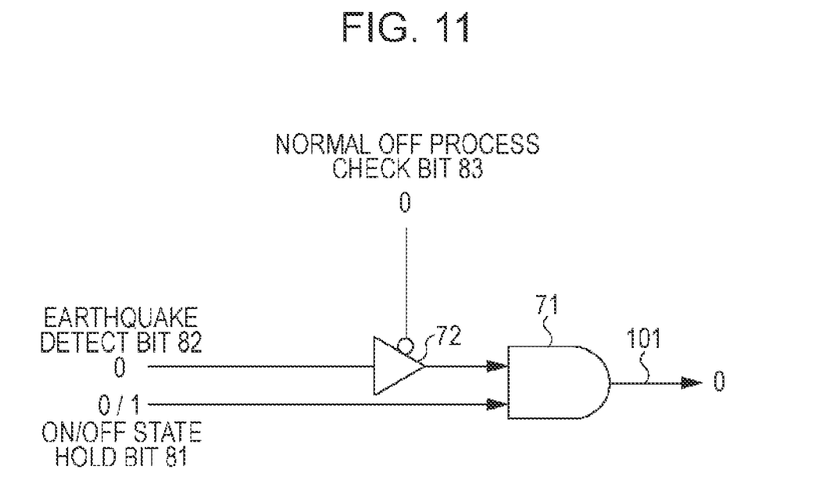
FIG. 11 is a diagram for explaining operation of a logic circuit in the case where an earthquake is detected, and a normal power-off process is not executed.

Lastly, in the case in which an earthquake was detected and a normal power-off process was not executed, the earthquake detect bit 82 becomes "0", and the normal off process check bit 83 also becomes "0", as illustrated in FIG. 11. For this reason, the buffer circuit 72 operates and outputs L based on the earthquake detect bit 82, and thus the ON/OFF state hold signal 101 becomes "0" (L), irrespectively of the logic level of the ON/OFF state hold bit 81.

Since such control is conducted, in cases such as where an earthquake is detected and a normal power-off process was not conducted, the device function unit 40 stays off even after recovering from a power failure, irrespectively of the logic level of the ON/OFF state hold bit 81.

MODIFICATIONS

The above exemplary embodiment describes a case of applying the present invention to an image forming device that prints an image onto a print medium. However, the present invention is not limited thereto, and may be similarly applied to another electrical apparatus whose ON/OFF state is controlled, such as a fax machine or a television.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power control device comprising:
   non-volatile memory that includes a function of externally outputting a logical state of a bit stored in a specific area as a state hold signal that indicates an ON/OFF state of a device function unit before a power cutoff;
   a controller that controls the ON/OFF state of the device function unit and also writes the ON/OFF state of the device function unit to the specific area of the non-volatile memory;
   a logic circuit that controls power supply to the controller on the basis of a logic level of the state hold signal from the non-volatile memory; and
   an acceleration detector that detects acceleration of the device function unit;
   wherein the controller, on the basis of an acceleration value detected by the acceleration detector, determines whether or not an earthquake occurred, and in a case of determining that an earthquake occurred, writes the occurrence of the earthquake to another specific area of the non-volatile memory different from the specific area,
   the non-volatile memory externally outputs a logical state of a bit stored in the other specific area as an earthquake detection signal that indicates whether or not an earthquake was detected, and
   the logic circuit conducts control to not supply power to the controller in a case in which the logic level of the earthquake detection signal from the non-volatile memory indicates that an earthquake was detected, even in a case in which the logic level of the state hold signal from the non-volatile memory indicates that the device function unit was in an ON state before the power cutoff.

2. The power control device according to claim 1, wherein in an initial state after power is supplied, the controller switches the device function unit to an ON state.

3. The power control device according to claim 1, wherein in an initial state after power is supplied, the controller switches the device function unit to an ON state only in a case in which the current time is within a preset time period.

4. The power control device according to claim 1, further comprising:
   a voltage generator that generates a voltage to supply to the controller;
   wherein the logic circuit puts the voltage generator in an operational state in a case in which the logic level of the state hold signal from the non-volatile memory indicates that the device function unit was in an ON state before the power cutoff and the logic level of the earthquake detection signal from the non-volatile memory indicates that an earthquake was not detected.

5. The power control device according to claim 2, further comprising:
   a voltage generator that generates a voltage to supply to the controller;
   wherein the logic circuit puts the voltage generator in an operational state in a case in which the logic level of the state hold signal from the non-volatile memory indicates that the device function unit was in an ON state before the power cutoff and the logic level of the earthquake detection signal from the non-volatile memory indicates that an earthquake was not detected.

6. The power control device according to claim 3, further comprising:
   a voltage generator that generates a voltage to supply to the controller;
   wherein the logic circuit puts the voltage generator in an operational state in a case in which the logic level of the state hold signal from the non-volatile memory indicates that the device function unit was in an ON state before the power cutoff and the logic level of the earthquake detection signal from the non-volatile memory indicates that an earthquake was not detected.

7. An electrical apparatus comprising:
   a power control device that includes non-volatile memory provided with a function of externally outputting a logical state of a bit stored in a specific area as a state hold signal that indicates an ON/OFF state of a device function unit before a power cutoff, a controller that controls the ON/OFF state of the device function unit and also writes the ON/OFF state of the device function unit to the specific area of the non-volatile memory, and a logic circuit that controls power supply to the controller on the basis of a logic level of the state hold signal from the non-volatile memory;
   a device function unit whose ON/OFF state is controlled by the power control device; and
   an acceleration detector that detects acceleration of the device function unit;
   wherein the controller, on the basis of an acceleration value detected by the acceleration detector, determines whether or not an earthquake occurred, and in a case of determining that an earthquake occurred, writes the occurrence of the earthquake to another specific area of the non-volatile memory different from the specific area,
   the non-volatile memory externally outputs a logical state of a bit stored in the other specific area as an earthquake detection signal that indicates whether or not an earthquake was detected, and
   the logic circuit conducts control to not supply power to the controller in a case in which the logic level of the earthquake detection signal from the non-volatile memory indicates that an earthquake was detected, even in a case in which the logic level of the state hold signal from the non-volatile memory indicates that the device function unit was in an ON state before the power cutoff.

8. An image forming device comprising:
   a power control device that includes non-volatile memory provided with a function of externally outputting a logical state of a bit stored in a specific area as a state hold signal that indicates an ON/OFF state of a device function unit before a power cutoff, a controller that controls the ON/OFF state of the device function unit and also writes the ON/OFF state of the device function unit to the specific area of the non-volatile memory, and a logic circuit that controls power supply to the controller on the basis of a logic level of the state hold signal from the non-volatile memory;

a device function unit, provided with an image output unit that outputs an image onto a print medium, whose ON/OFF state is controlled by the power control device; and an acceleration detector that detects acceleration of the device function unit;

wherein the controller, on the basis of an acceleration value detected by the acceleration detector, determines whether or not an earthquake occurred, and in a case of determining that an earthquake occurred, writes the occurrence of the earthquake to another specific area of the non-volatile memory different from the specific area, the non-volatile memory externally outputs a logical state of a bit stored in the other specific area as an earthquake detection signal that indicates whether or not an earthquake was detected, and the logic circuit conducts control to not supply power to the controller in a case in which the logic level of the earthquake detection signal from the non-volatile memory indicates that an earthquake was detected, even in a case in which the logic level of the state hold signal from the non-volatile memory indicates that the device function unit was in an ON state before the power cutoff.

* * * * *